United States Patent Office 3,340,275
Patented Sept. 5, 1967

3,340,275
PERHALO CONTAINING AIR-DRYING MONOMERS
Robert A. Braun, Newark, Del., assignor to E. I. du Pont de Nemours and Company, Wilmington, Del., a corporation of Delaware
No Drawing. Filed July 25, 1963, Ser. No. 297,677
5 Claims. (Cl. 260—340.9)

ABSTRACT OF THE DISCLOSURE

The disclosure is directed to compounds of the formula

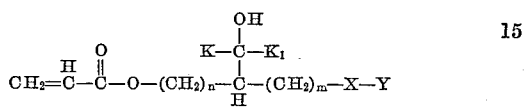

where X is an alkyl, substituted alkyl, substituted phenyl, alkenyl or substituted alkenyl radical,
Y is a substituted dioxanyl or substituted dioxolanyl radical and
K and $K_1$ are perchloroalkyl, perfluoroalkyl or perchlorofluoroalkyl radicals, and a process for their preparation.

---

This invention relates to new air-drying fluorine-containing compounds, and to coating compositions made from them.

It is more particularly directed to fluorine-containing compounds of the formula (1)

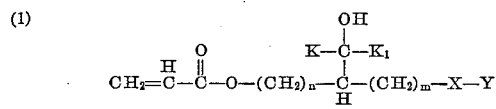

where
$n$ is 1 or 2;
$m$ is 0–5;
X is

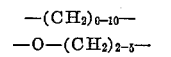
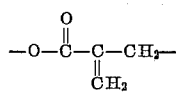
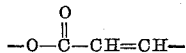
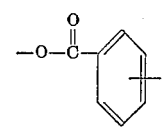
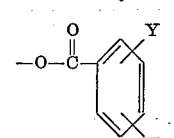
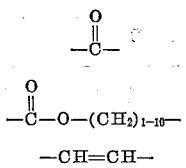

or

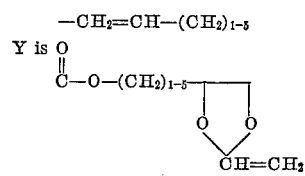

Y is

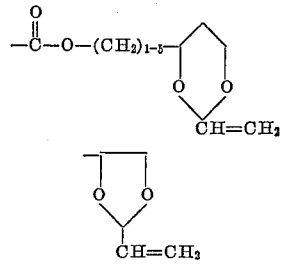

or

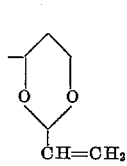

and K and $K_1$ are perchloroalkyl, perfluoroalkyl, or perchloro-fluoroalkyl radicals, all containing 1 through 5 carbon atoms.

Illustrative of the perchloro-fluoro radicals in the K and $K_1$ positions are —$CF_3$, —$CF_2Cl$, —$CCl_2F$, —$C_2F_5$, —$C_3F_7$, —$C_5F_{11}$, $C_4F_9$ and —$CF_2Cl$.

This invention is also directed to air-drying fluorine-containing monomers having the structure (2)

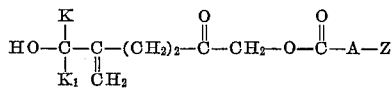

where A is

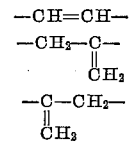
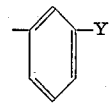

Z is

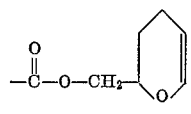

or

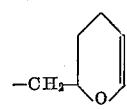

and K and $K_1$ are as described in Formula 1.

*Utility*

The compounds of Formulae 1 and 2 polymerize in the presence of siccative metal compounds and oxygen to form insoluble, tough, durable coatings. The compounds are therefore useful as film-formers in coating compositions.

The presence of fluorine atoms in the compounds gives the resulting finishes superior durability and resistance to steam, water and solvents. This makes them suitable for use in formulating metal protective primers, aerosol enamels, automotive refinish enamels, decorative coatings for tin plate and exterior and interior housepaints.

The compounds are liquids and so require no solvents in their formulation. Thus, coating compositions containing 100% of film-former are feasible.

Preferred for this use are:

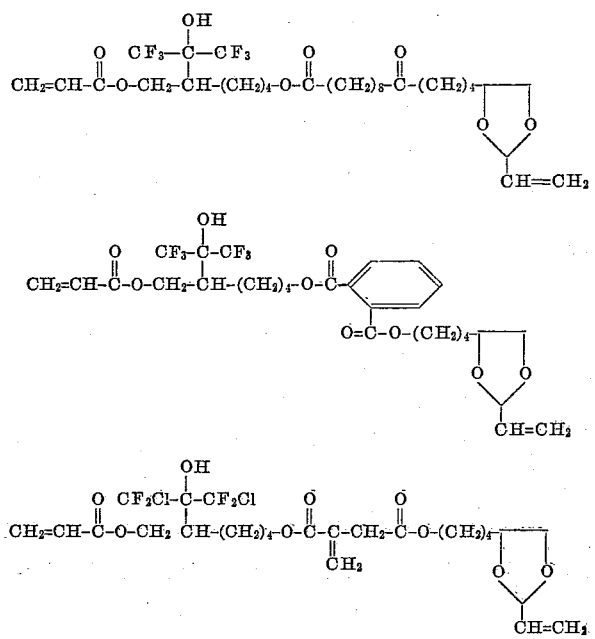

and

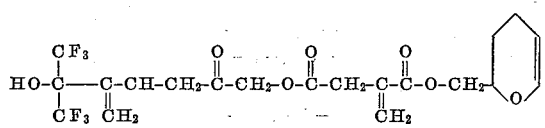

*Preparation of compounds*

The compounds of Formula 1 can be prepared according to the equation

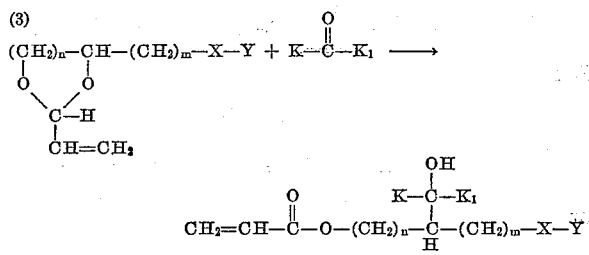

The compounds of Formula 2 can be prepared according to the equation

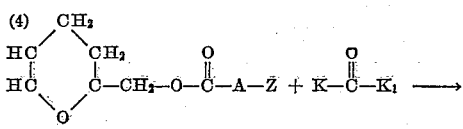

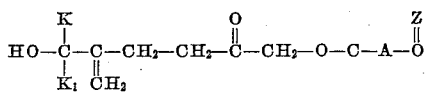

In Equations 3 and 4, X, Y, A, Z, K, $K_1$, $m$ and $n$ are defined as in Formulae 1 and 2.

Some of the starting materials used in the method of Equation 3 can be made by the reaction of hydroxyalkyl-2-vinyl-1,3-dioxolanes or dioxanes with polyfunctional acids. This is set forth in greater detail in U.S. Patent 3,010,923 to Carol K. Ikeda. Others can be made by the reaction of acrolein with polyols, as described in J. Org. Chem., 25, 319 (1960).

Certain of the starting material used in the method of Equation 4 can be made by the reaction of dihydropyran-2-methanol with polyfunctional acids. This is described in detail in U.S. application Ser. No. 99,047, filed Mar. 29, 1961 and now abandoned. Others are commercially available.

The lower perhaloketone reactants are available commercially. The higher ketones can be made by methods described in M. Haupschein and R. A. Braun, J.A.C.S., 77, 4930 (1955).

The reactions of Equations 3 and 4 are carried out by mixing exactly equimolar quantities of the reactants and then placing them in a bomb with about an equal volume of a hydrocarbon solvent such as benzene or hexane.

The bomb is then heated to a temperature of from 100–175° C., preferably at 125–150° C. This temperature is maintained for from 1 to 12 hours. In most instances, the reaction will be substantially complete in about five hours. Completion can be determined by observing a decrease in pressure during the reaction.

Generally, from 0.1 to 1% of a free radical inhibitor such as hydroquinone is used to prevent polymerization during heating.

The compounds are isolated by removing the solvent and traces of unreacted ketone under vacuum. The liquid essentially pure product is left behind. This can be used directly in the preparation of coating compositions.

*Preparation of coating compositions*

Coating compositions can be prepared using the compounds of this invention by simply mixing them with the usual amount of a conventional siccative metal drier such as cobalt butyl phthalate. This gives clear, unpigmented finishes. If desired, conventional pigments, in the usual amounts, can be added to these coating compositions by the usual blending and grinding techniques of sand-grinding, ball-milling, or the like.

The coating compositions of this invention can also be used together with other liquid air-drying coating compositions to give various modifying effects.

The compositions of the invention can be applied by brushing, dipping or spraying, and require no special processing or equipment. If thinning is required, the compositions can be diluted with conventional paint thinners such as esters or ketones.

The invention is illustrated by the following examples:

EXAMPLE 1

The following are added to a one-liter stainless steel bomb:

| | Parts |
|---|---|
| Itaconic acid diester of 4-hydroxymethyl-2-vinyl-1,3-dioxolane | 129 |
| Hydroquinone | 0.3 |
| Benzene | 300 |
| Hexafluoroacetone | 50 |

The bomb is heated to 125° C. and is held at that temperature for five hours.

It is then cooled to room temperature and the solvent is removed by vacuum stripping at 25° C. and 0.1 mm.

of pressure to give 183 parts of an essentially pure pale yellow fluid having the structure

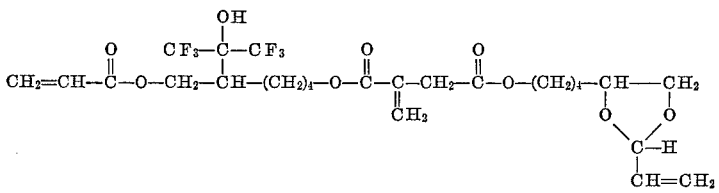

A coating composition can be prepared, using this compound as a film-former, by mixing it with 0.05% of cobalt butyl phthalate.

This composition is applied to a steel plate with a 3-mil doctor blade to a film thickness of about 1.5 mils. This film dries to a tack-free state in about 5 hours at 25° C. The drying time can be shortened by baking at a temperature of from 40–150° C. The actual drying time is naturally determined by the film thickness as well as the temperature.

The ketones and cyclic acetal derivatives listed in the following table can be used in place of hexafluoroacetone and the itaconic acid diester of 4-hydroxymethyl-2-vinyl-1,3-dioxolane, in the same proportions, to give the corresponding compounds of the invention, which can be similarly formulated into coating compositions:

Perfluorohepan-4-one
1,1,2-trichlorotrifluoroacetone
Terephthalic acid diester of 4-hydroxybutyl-2-vinyl-1,3-dioxolane
Sebacic acid diester of 4-hydroxymethyl-2-vinyl-1,3-dioxolane

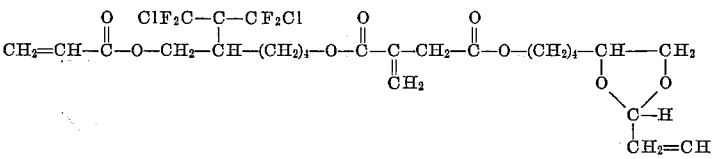

Itaconic acid diacid ester of 4-hydroxymethyl-2-vinyl-1,3-dioxane
2-vinyl-5-octenedioic acid diacid ester of 4-hydroxybutyl-2-vinyl-1,3-dioxolane

EXAMPLE 2

The following are charged to a stainless steel bomb:

| | Parts |
|---|---|
| Maleic acid diester of 4-hydroxymethyl-2-vinyl-1,3-dioxolane | 42.4 |
| Benzene | 150 |
| Hexafluoroacetone | 16.6 |
| Hydroquinone | 0.2 |

The bomb is heated to 125° C. and maintained at this temperature for 6 hours.

It is then cooled and the solvent removed by stripping to give 63.8 parts of a slightly viscous oil having the structure

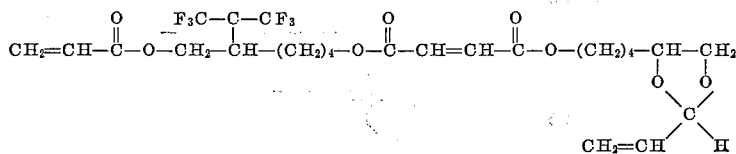

0.05 percent of cobalt butyl phthalate is added to this oil and it is then applied to a steel plate with a 3.3-mil doctor blade to a film thickness of about 1.5 mils. This film dries tack-free at 80° C. in less than 2 hours. The same film dries tack-free at 25° C. in less than 18 hours.

The ketones and dioxane derivatives listed in the following table can be used in place of hexafluoroacetone and the maleic acid diester of 4-hydroxymethyl-2-vinyl-1,3-dioxolane, in the same proportions, to give the corresponding compounds of the invention which can be similarly formulated into coating compositions:

Perfluorohepan-2-one
1,1,1-trichlorotrifluoroacetone
Perfluoropentan-2-one
2-vinyl-1,3-dioxolane-4-butyric acid ester of 4-hydroxymethyl-2-vinyl-1,3-dioxolane
1,2-bis-[4-(2-vinyl-1,3-dioxaneyl)]ethane

EXAMPLE 3

The following are placed in a stainless steel bomb:

| | Parts |
|---|---|
| Itaconic acid diester of 4-hydroxybutyl-2-vinyl-1,3-dioxolane | 176 |
| 1,3-dichlorotetrafluoroacetone | 80 |
| Benzene | 200 |
| Hydroquinone | 0.3 |

The bomb is heated at 150° C. for four hours. It is then cooled and the solvent stripped under vacuum to give 245 parts of a clear yellow essentially pure oil having the structure A coating composition is prepared using this compound as a film-former by adding 50 parts of titanium dioxide, pigment grade, to 100 parts of the compound.

This mixture is then sand-ground to give a smooth dispersion to which are added, with thorough mixing, 0.05 parts of cobalt as cobalt octoate.

This composition is applied by brush as a house paint to give a glossy, adherent and durable coating.

EXAMPLE 4

The following are placed into a stainless steel bomb:

| | Parts |
|---|---|
| Itaconic acid diester of dihyropyran-2-methanol | 64.2 |
| Benzene | 100 |
| Hexafluoroacetone | 34 |

The bomb is heated at 150° C. for 4 hours. The mixture is then cooled and the solvent removed under vacuum to give 114 parts of a clear, orange viscous liquid having the structure

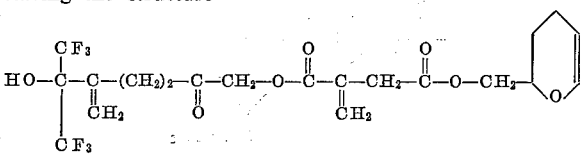

10 parts of this compound are mixed with 0.05 part of cobalt (as cobalt butyl phthalate) applied to a redwood panel. The film dries to a clear, tack-free coating after twenty-four hours at room temperature, or after about one hour of baking at 50° C.

The reactants in the following list can be used in place of the hexafluoroacetone and the itaconic acid diester of dihydropyran-2-methanol, in the same proportions, to give corresponding compounds of the invention:

Perfluorobutan-2-one
Perfluoropentan-3-one
Chloropentafluoroacetone
1,1,2,2-tetrachlorodifluoroacetone
Fumaric acid diester of dihydropyran-2-methanol
o-Phthalic acid diester of dihydropyran-2-methanol
Sebacic diester of dihydropyran-2-methanol
Dihydropyran-2-carboxylic acid ester of 2-dihydropyran-2-methanol

I claim:
1. A compound of the formula

$$CH_2=C(H)-C(O)-O-(CH_2)_n-C(K)(K_1)(OH)-(CH_2)_m-X-Y$$

where $n$ is 1 or 2,
$m$ is 0–5,
X is $$-(CH_2)_{0-10}-$$
$$-O-(CH_2)_{2-5}-$$
$$-O-C(O)-C(=CH_2)-CH_2-$$
$$-O-C(O)-CH=CH-$$
$$-O-C(O)-C_6H_4-$$ (phenyl)
$$-C(O)-O-C_6H_3(X)(Y)-$$ (phenyl disubstituted)
$$-C(O)-$$
$$-C(O)-O-(CH_2)_{1-10}-$$
$$-CH=CH-$$

or $$-CH_2=CH-(CH_2)_{1-5}-$$

Y is $$-C(O)-O-(CH_2)_{1-5}-\text{(dioxolane ring with } CH=CH_2\text{)}$$

or $$\text{(dioxolane ring with } CH=CH_2\text{)}$$

and

K and K$_1$ are perchloroalkyl, perfluoroalkyl or perchloro-fluoroalkyl radicals, all containing 1–5 carbon atoms.

2. A compound of the formula $$CH_2=CH-C(O)-O-CH_2-CH(OH)(C(CF_3)_2)-(CH_2)_4-O-C(O)-(CH_2)_8-C(O)-(CH_2)_4-\text{[dioxolane-CH=CH}_2\text{]}$$

3. A compound of the formula $$CH_2=CH-C(O)-O-CH_2-CH(OH)(C(CF_3)_2)-(CH_2)_4-O-C(O)-C_6H_4-C(O)-O-(CH_2)_4-\text{[dioxolane-CH=CH}_2\text{]}$$

4. A compound of the formula $$CH_2=CH-C(O)-O-CH_2-CH(OH)(C(CF_2Cl)_2)-(CH_2)_4-O-C(O)-C(=CH_2)-CH_2-C(O)-O-(CH_2)_4-\text{[dioxolane-CH=CH}_2\text{]}$$

5. A process for the preparation of compounds of the formula $$CH_2=C(H)-C(O)-O-(CH_2)_n-C(K)(K_1)(OH)-(CH_2)_m-X-Y$$

where $n$ is a whole positive number less than 4;
$m$ is 0–5;
X is selected from the group consisting of $$-(CH_2)_{0-10}-$$
$$-O-(CH_2)_{2-5}-$$
$$-O-C(O)-C(=CH_2)-CH_2-$$
$$-O-C(O)-CH=CH-$$
$$-O-C(O)-C_6H_4-$$
$$-O-C(O)-C_6H_3(Y)(Y)-$$
$$-C(O)-$$

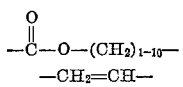
and
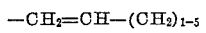
Y is selected from the group consisting of
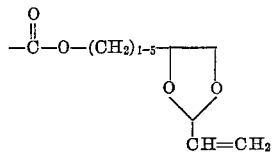
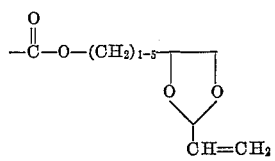
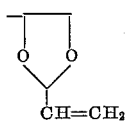
and
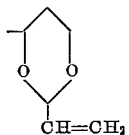

and K and $K_1$ are selected from the group consisting of perchloroalkyl, perfluoroalkyl, and perchloro-fluoro-alkyl radicals, all containing 1 through 5 carbon atoms;

said process comprising
 (a) reacting a compound of the formula

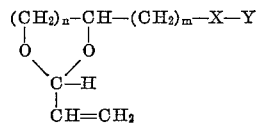

where X, Y and $m$ are defined as above, with an equimolar quantity of a perhaloketone of the formula

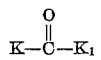

where K and $K_1$ are defined as above, in an inert solvent, at a temperature of about 100–175° C.;
 (b) and then isolating the product by removing the inert solvent and traces of unreacted ketone from the reaction mass.

No references cited.

ALEX MAZEL, *Primary Examiner.*

WALTER A. MODANCE, *Examiner.*

J. M. FORD, J. TURNIPSEED, *Assistant Examiners.*

UNITED STATES PATENT OFFICE
CERTIFICATE OF CORRECTION

Patent No. 3,340,275 September 5, 1967

Robert A. Braun

It is hereby certified that error appears in the above numbered patent requiring correction and that the said Letters Patent should read as corrected below.

Column 8, lines 63 to 66, the structural formula should appear as shown below instead of as in the patent:

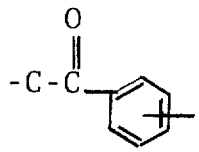

same column 8, lines 69 to 74, the structural formula should appear as shown below instead of as in the patent:

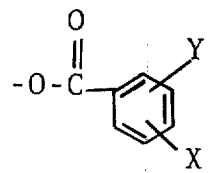

Signed and sealed this 3rd day of September 1968.

(SEAL)
Attest:

EDWARD M. FLETCHER, JR.
Attesting Officer

EDWARD J. BRENNER
Commissioner of Patents